(12) United States Patent
Oosterling

(10) Patent No.: US 6,257,169 B1
(45) Date of Patent: Jul. 10, 2001

(54) MILKING DEVICE WITH CONTROL SYSTEM AND SENSORS

(75) Inventor: Pieter Adriaan Oosterling, Nieuw-Vennep (NL)

(73) Assignee: Prolion B.V. (NL)

(*) Notice: Subject to any disclaimer, the term of this patent is extended or adjusted under 35 U.S.C. 154(b) by 0 days.

(21) Appl. No.: 09/462,983
(22) PCT Filed: Jul. 15, 1998
(86) PCT No.: PCT/NL98/00411
  § 371 Date: Apr. 10, 2000
  § 102(e) Date: Apr. 10, 2000
(87) PCT Pub. No.: WO99/03332
  PCT Pub. Date: Jan. 28, 1999

(30) Foreign Application Priority Data

Jul. 16, 1997 (NL) .................................................. 1006590

(51) Int. Cl.⁷ ............................. A01J 5/00; A01J 5/01
(52) U.S. Cl. ............................ 119/14.02; 119/14.14
(58) Field of Search ....................... 119/14.02, 14.08, 119/14.14, 14.15

(56) References Cited

U.S. PATENT DOCUMENTS

| 4,616,215 | * | 10/1986 | Maddalena | 119/14.14 |
| 4,726,322 | * | 2/1988 | Torsius | 119/14.14 |
| 5,152,246 | * | 10/1992 | Wakui et al. | 119/14.15 |
| 5,873,323 | * | 2/1999 | van den Berg et al. | 119/14.08 |
| 6,116,188 | * | 9/2000 | van der Lely | 119/14.02 |

FOREIGN PATENT DOCUMENTS

| 0232568 | 8/1987 | (EP) . |
| 0736246 | 10/1996 | (EP) . |
| 0768026 | 4/1997 | (EP) . |
| 1372355 | 10/1974 | (GB) . |

* cited by examiner

Primary Examiner—Charles T. Jordan
Assistant Examiner—Elizabeth Shaw
(74) Attorney, Agent, or Firm—Webb Ziesenheim Logsdon Orkin Hanson, P.C.

(57) ABSTRACT

A device for milking an animal is controlled by a control system connected to sensors for detecting the position of the animal and the position of various components of the device. Each sensor and the control system are coupled via a transducer which is located at a different position from the sensor. Each sensor and the transducer are electrically insulated from one another.

12 Claims, 2 Drawing Sheets

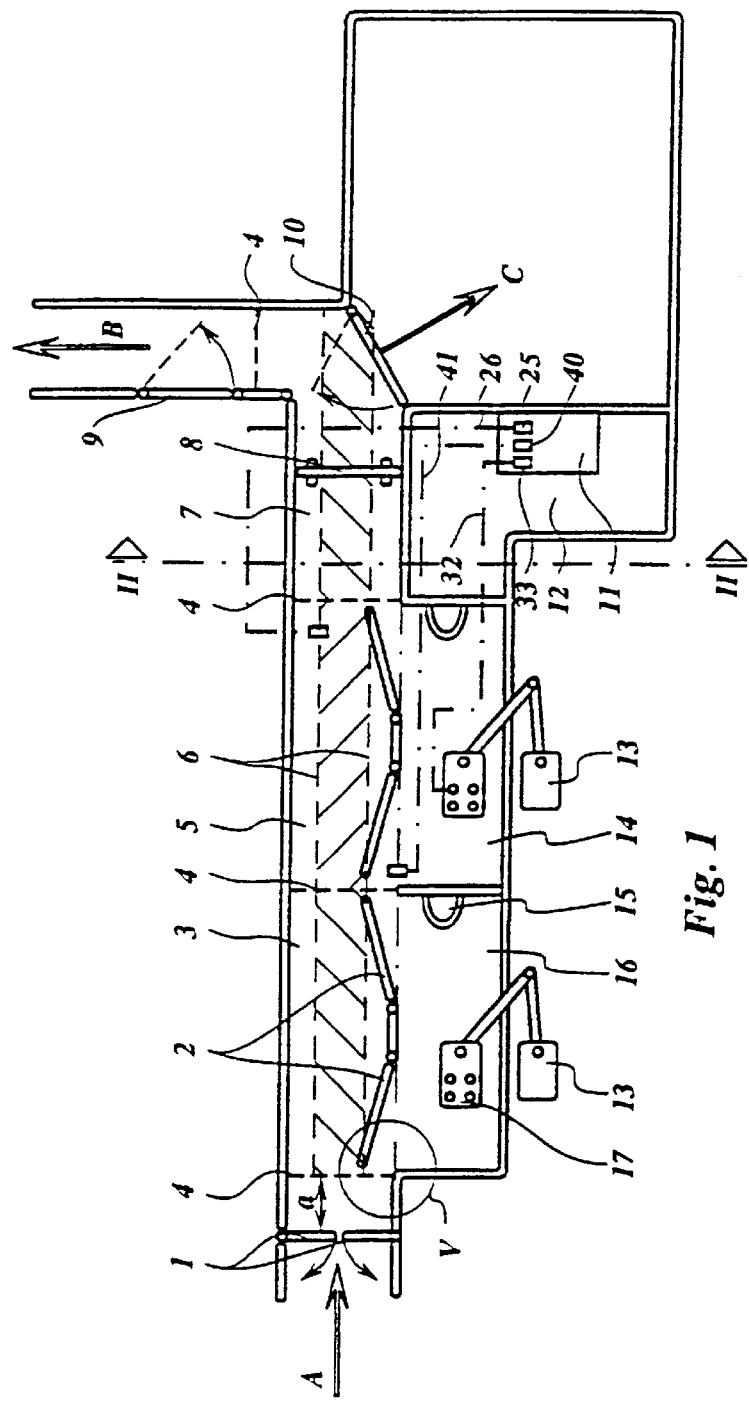
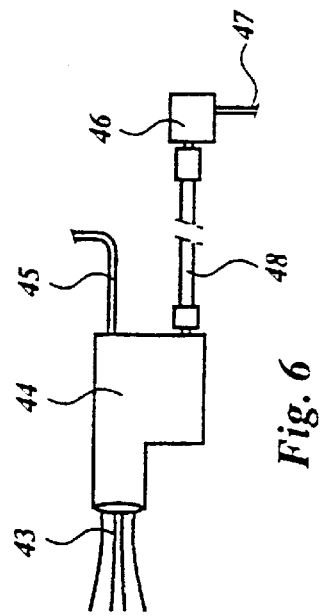
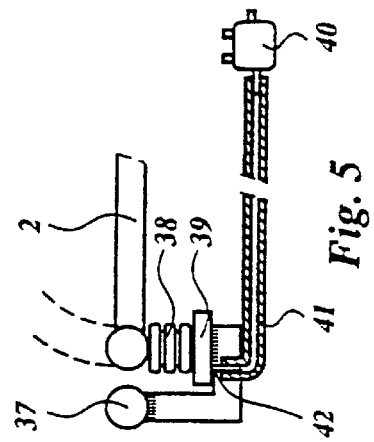
Fig. 1
Fig. 6
Fig. 5

MILKING DEVICE WITH CONTROL SYSTEM AND SENSORS

BACKGROUND OF THE INVENTION

A device for milking animals, includes a milking parlour and milking equipment having milking cups, a control system and at least one sensor for detecting the position or other properties of the animals to be milked, or parts thereof, and/or for detecting the position or actions of various components of the milking device.

Devices of this kind are known, it being possible for the sensor to carry out detections which in the sensor are converted into an electrical signal. This electrical signal is coupled, for example via electric cables, to the control system, where it is processed.

The drawback of the known devices is that such sensors, which are located in the vicinity of the cows to be milked, are provided with long electrical connections to the control system. The long cables running between the control system and the sensors run through the milking parlour and are particularly susceptible to picking up electromagnetic interference. This interference often occurs, for example, during thunderstorms, but is also caused by switching on motors for the milk-cooling system, the vacuum pump and the like and by the use of high voltage for provoking the animals to move and, for example, when electrified wire is used. This electromagnetic interference propagates into the control system, where it is sometimes treated as if it were a signal from sensors. These incorrect sensor signals can disrupt the control system, which is undesirable.

SUMMARY OF THE INVENTION

The object of the invention is to eliminate the abovementioned drawback, and to this end the sensor is provided with a transducer for converting a signal produced by the sensor into an electrical signal which can be processed by the control system, the transducer being located at a different position from the sensor and the sensor and the transducer being electrically insulated from one another. As a result, the control system is no longer affected by undesirable interference signals.

According to an improvement to the invention, the transducer is located in a switch cabinet. This allows the electric lines from the transducer in the switch cabinet to the control system to be installed in advance and suitably protected and also allows the lines to parts of the milking parlour which are not electrically conductive to be installed later, thus simplifying assembly.

According to one embodiment of the invention, the sensor for detecting the presence of an animal comprises, inter alia, a switching platform, as well as bellows on which at least part of the switching platform rests, a transducer which is able to convert changes in air pressure into an electrical signal and an air line for connecting the bellows and the transducer. The result is a robust sensor which is easy to connect and can be placed in the wet floor area of a milking parlour without any risk of parts of the parlour being placed under electrical voltage.

According to another aspect of the invention, the transducer comprises a switch which is adjusted in such a manner that it switches when the platform is loaded with a weight which essentially corresponds to the weight of an animal to be milked. As a result, no signal is transmitted if, for example, the farmer steps onto the switching platform, while a signal is transmitted if a cow does so. This prevents the control system of the device from being affected by the farmer when he/she walks through the parlour and the gangways to carry out maintenance, so that faults are avoided.

According to a further improvement, a passageway along the milking parlour comprises a plurality of switching platforms which are covered with a common cover, such as a rubber mat. By dividing the passageway into a plurality of sections, each with one or more switching platforms and placing a common cover over them, it is possible in a simple manner to detect the progress of a cow through the passageway, while the sensors cannot be contaminated, owing to the fact that they are well covered.

According to a further improvement, the passageway is provided with a mechanically driven, moveable slide. This allows excrement, for example, to be cleaned off the top side of the common cover in a simple manner, while the mechanically driven, moveable slide can also be used to drive animals into the passageway and to stimulate them to leave the passageway.

According to another embodiment of the invention in which the milking cups are provided with an entry chamber containing a sensor, inter alia for detecting the presence of a teat in the milking cup, the sensor comprises a transducer which is able to convert changes in air pressure into an electrical signal, as well as an air line for connecting the entry chamber to the transducer. This prevents a sensor which operates using electrical voltage from being used in the region of a very sensitive body part of a cow, which is frequently also moist as a result, for example, of cleaning, for detecting whether the teat has been placed in the milking cup. Measuring the pressure in the entry chamber has been found to be sufficient to detect the presence of a teat. This is because it has been found that the variation in pressure in the entry chamber provides a clear indication of whether the teat has been arranged correctly. This is because if the teat has not been put in position or has fallen out, there is virtually no pressure reduction in the entry chamber, while if the teat is folded double at the top of the milking cup a considerable, more or less constant subatmospheric pressure prevails in the entry chamber, while if the teat has been arranged correctly there is a slightly fluctuating subatmospheric pressure which is of a lesser magnitude than the subatmospheric pressure in the milking line.

According to a further improvement, the transducer is able to convert the pressure measured into an electrical signal which is proportional to the pressure. As a result, the pressure profile in the entry chamber can be recorded accurately in the control system and the latter can be used, if appropriate, to adjust the subatmospheric pressure in the milking cup or to adjust the milking process in some other way.

According to another application of the invention in which a part of the milking device which can be moved by means of the control system, such as for example a moveable fence, is provided with a sensor for detecting a position thereof, the sensor comprises bellows, as well as a transducer which is able to convert changes in air pressure into an electrical signal, and an air line for connecting the bellows and the transducer. As a result, there is no longer any need to use sensors which operate with electrical voltage in the vicinity of the animals, with the result that they are no longer able to bite into the electric cabling, and faults are avoided and assembly is simplified.

According to another aspect of the device according to the invention, the sensor is able to generate an optical signal and the device comprises a transducer, which is able to convert the optical signal into an electrical signal, as well as a fibre optic cable for connecting the sensor and the transducer. As a result, there is no need to connect any long electric cabling to the control system, while it is nevertheless possible to transmit sensor sianals containing large amounts of information to the control system.

According to one embodiment of the invention in which the milking equipment comprises an application system for automatically applying milking cups around the teats of an animal to be milked, and the control system controls the application system on the basis of the information obtained using sensors, a fibre optic cable is provided for the purpose of transferring data between the control system and the application system. This avoids a further source of interference which is caused by the fact that the cabling would pick up signals caused by electromagnetic interference in the milking parlour environment.

The invention also comprises a method for automatically milking animals with a device according to the invention, in which it is measured, by means of a sensor, whether an udder quarter has been milked dry using a milking cup provided with an entry chamber, after which the milking of the udder quarter in question is terminated. These sensors generally work on detecting the flow of milk, with the result that the detection always requires a certain time after the flow of milk has ended, because this detection takes place in the bottom of the milking cup or by means of a milk meter positioned in the milking line. In addition, detection means of this kind are fragile and susceptible to contamination.

The object of the invention is to avoid these drawbacks, and to this end the sensor is a pressure sensor which can be used to measure the profile of the pressure in the entry chamber, and the milking is terminated when the pressure in the entry chamber during milking falls by an adjustable value. It has been found that the diameter of the teat becomes smaller when the milking quarter is empty, with the result that the milking cup creeps further towards the udder and less leakage air passes through the gap between the teat and the opening in the milking cup. As a result, the pressure in the entry chamber falls, and this therefore represents a direct indication that the udder quarter is empty.

BRIEF DESCRIPTION OF THE DRAWINGS

The invention is explained below with reference to a number of exemplary embodiments which are discussed with reference to a drawing, in which:

FIG. 1 shows a diagrammatic plan view of a milking device for cows,

FIG. 5 shows the detail V from FIG. 1, and

FIG. 6 shows a diagrammatic view of a position sensor.

DETAILED DESCRIPTION OF THE PREFERRED EMBODIMENTS

Figure 2:
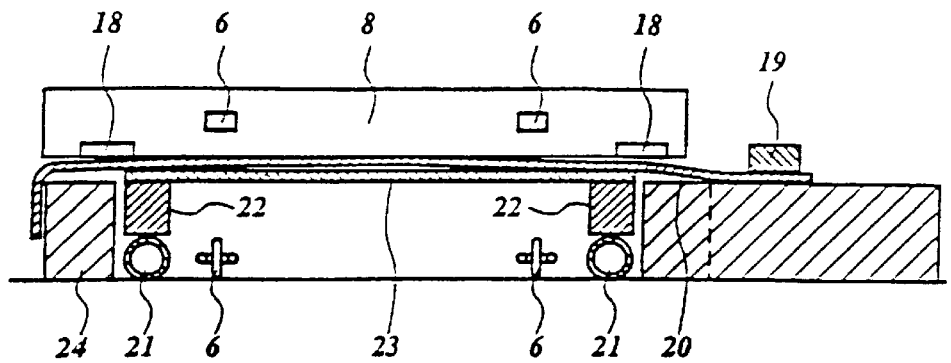
FIG. 2 shows the cross-section II—III from FIG. 1.

In the various figures, corresponding components are provided as far as possible with the same reference numerals.

FIG. 1 shows a diagrammatic plan view of an automatically operating milking device, in which cows can be milked unmanned, i.e. without human supervision. The cows are enticed out of the meadow and into the milking device, for example with the aid of enticement feed in a feeding trough 15, and are guided into a first milking parlour 16 or a second milking parlour 14, where they are milked. The movements of the cows and the movements of the various components of the milking device are monitored with the aid of sensors which are connected to a control system which is positioned in a switch cabinet 11. This switch cabinet 11 is positioned in an operating chamber 12. The first milking parlour 16 and the second milking parlour 14 are provided with application equipment 13 for the milking cups which are located on a milking rack 17.

For milking purposes, the cow can be guided into the milking parlour, which is then closed off by means of a moveable fence 2. The cows enter the milking device via an entry A and then move into one of the milking parlours, and after they have been milked they leave the device via an exit B. If the milking cups have not been correctly connected and the cows need to be milked again, they are returned to the entry A after leaving the milking parlour, for which purpose a short-circuit gate 9 is opened. If there is a reason to isolate the cow, for example because it has been found that the cow is sick, it is guided into an isolation chamber in the direction C, by means of an isolation gate 10.

It is important that the control system always knows where a cow is situated after it has entered the milking device. For this purpose, a number of measures are used, for example an entry gate 1, which ensures that the cows can only enter the milking device one by one.

Sensors which are able to detect the movements of the cow are also provided. In addition to sensors for detecting the movements of the cow, sensors are also provided for monitoring the movements of the fences, since, by way of example, a cow's body can prevent the fence from closing correctly. For the purpose of monitoring progress, that is to say for signalling the presence of a cow, the passageway is divided into a first detection area 3, a second detection area 5, with a separation 4 between them, and a third detection area 7 which is also separated from the second detection area using a separation 4.

The first detection area 3 covers the area in front of the first milking parlour 16 and the second detection area 5 covers the region in front of the second milking parlour 14. The third detection area 7 lies in the direction of the exit B. Sensors which will be discussed below are arranged in each separate detection area. These sensors are connected to the control system, and combining the detection of the cow in a specific detection area with previous detections allows the control system to know where an animal is situated, and it is possible to ensure that only one cow is ever present in the area in front of the milking parlours.

In order to ensure that in each case one cow enters the milking device separately, the first detection area 3 is placed at a distance a from the entry gate 1. As a result, the passage of one cow is detected after its head and most of its body has passed the entry gate 1. As soon as the presence of the cow in the first detection area 3 is signalled, the entry gate 1 closes. The distance a is selected to be such that the entry gate 1 closes behind the hipbone of the cow, with the result that it does not become jammed.

It is usual, with an entry gate, such as entry gate 1, to employ a cow recognition system, the cow being identified with the aid of a transponder which is present around its neck. It would be obvious also to use this system for signalling the presence of a cow. However, it has been found that a system of this kind is insufficiently reliable, since situations also arise where cows have lost the transponder, with the result that they would no longer be observed when entering the milking device. This does not occur if the passage signalling device which is to be discussed below is used.

Figure 3:
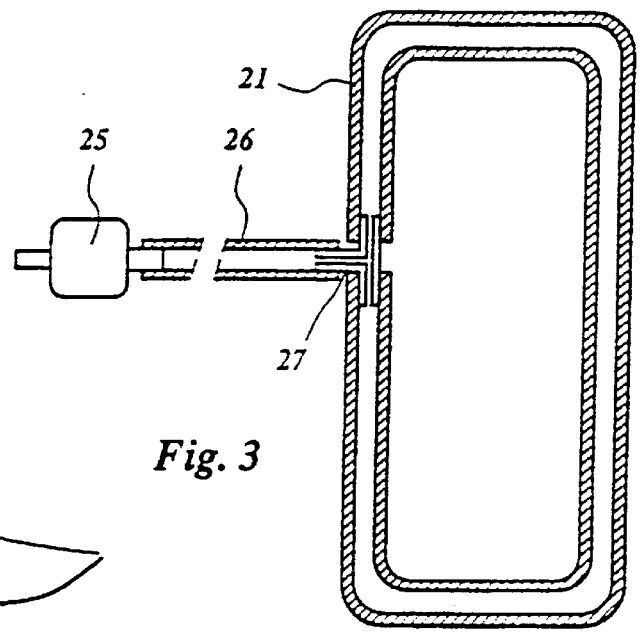
FIG. 3 shows a diagrammatic plan view of a sensor as used in FIG. 2.

FIGS. 2 and 3 show the sensor for passage signalling. The sensor comprises a hose 21, the ends of which are coupled to a T-piece 27 which is connected, by means of a connecting hose 26, to a pressure switch 25. The hose 21 lies below support bars 22 of a plate 23. The plate 23 lies between a bar 24 and the milking parlour or the operating chamber. A rubber mat 20, which is fixed to the milking parlour or the operating chamber by means of an attachment strip 19, is laid over the plate 23, preventing contamination from passing beneath the plate 23.

A cleaning slide 8 can be moved along the rubber mat 20 in the longitudinal direction. The cleaning slide 8 is supported by means of sliding supports 18 on the rubber mat 20 and is moved by means of an endless chain 6. The cleaning slide 8 can be used to clean, for example, excrement from the cow off the top side of the mat 20. The cleaning slide 8 can also be used to stimulate the animals to walk through the passageway, so that they can be prevented from standing still in front of the exit from a milking parlour. If appropriate, upwardly projecting prongs may be arranged on the slide for this purpose. The pressure switch 25 is arranged in the switch cabinet 11, and the connecting hose 26 connects hose 21, via the T-piece 27, to the pressure switch 25. The hose 21 is a special thick-walled rubber hose which is sufficiently stiff for it to compress to a sufficient extent only under the weight of a cow. In the embodiment, shown, the hose 21 is designed as an annular line, but it is also possible for it to be closed off at one end or for two or more platforms 23 to rest on the same hose.

The length of the connecting hose 26 may amount to 15 metres or more without affecting its action. This is because a pressure sensor 25, for example from the manufacturer Honeywell, can detect a pressure difference of a few millibar to tens of millibar without any problems. The hoses 21 and 26 may be completely airtight or may have a small opening with a slight leakage, with the result that the volume of air in the hose can be adapted to varying temperatures. The slight leakage in the hoses 21 and 26 has no effect on the detection of the cows, since the pressure sensor 25 can detect the pressure shock which occurs when the plate 23 is loaded by the weight of a cow, which detection is recorded in the control system. A small opening or leakage in the hoses has no effect on this pressure shock.

The resilience of hose 21 and the setting of pressure switch 25 are adapted to one another in such a manner that load from the weight of a cow is signalled, but if the plates are subjected to a lower weight, for example if the farmer steps onto plate 23, this will not have any effect on the pressure switch 25. As a result, the farmer walking through the milking device has no effect on the action of the system, so that no incorrect detections are performed and the control system does not become irregular.

Figure 4:
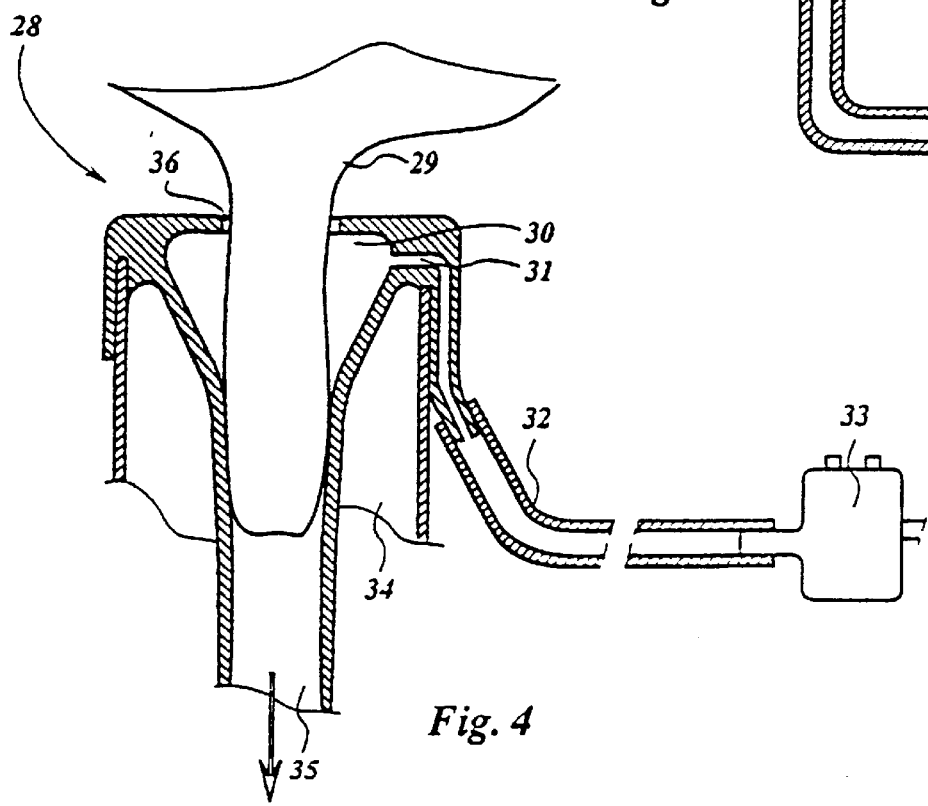
FIG. 4 shows a milking cup with a teat provided with a sensor.

FIG. 4 shows the cross-section of a milking cup 28 with a teat 29 therein. A changeable subatmospheric pressure prevails in a pulsation chamber 34, while a constant subatmospheric pressure prevails in a milking line 35, with the result that milk is removed from teat 29 in a known manner. An entry chamber 30, also known as a "buffer", is arranged at the top of the milking cup 28, the pressure in which entry chamber is measured, via a connecting duct 31 and a hose 32, in a pressure pick-up 33. The pressure pick-up 33 is positioned in a switch cabinet, for example the switch cabinet 11 or a switch cabinet in the vicinity of the milking rack 17. The pressure pick-up 33 is able to convert the pressure in the hose 32 into an electrical signal, various switching points of which may be recorded in the control system. It is also possible to use different pressure switches.

A more or less constant subatmospheric pressure prevails in the milking line 35, which pressure is lower than the pressure in the entry chamber 30, since air is supplied past the teat 29 via an air gap 36.

Consequently, the level of the air pressure in the entry chamber 30 provides an indication of whether the teat 29 has been connected to the milking cup 28 in the correct manner. If this has taken place in the correct manner, as shown in FIG. 4, the subatmospheric pressure in the entry chamber 30 is approximately half the subatmospheric pressure in the milking line 35, and this pressure fluctuates with the frequency of the pulses in the pulsation chamber 34. If there is no teat 29 in the milking cup 28 and the opening to the milking cup 28 is completely open, there is scarcely any subatmospheric pressure in the entry chamber 30, since the pressure of the external air then prevails in the said entry chamber. If the teat 29 is folded double against the udder, with the result that the opening to milking cup 28 is more or less closed off, the complete subatmospheric pressure in the milking line 35 is present also in the entry chamber 30, so that the pressure level is more or less constant. These different pressure levels and the fluctuations therein can be recorded by means of the pressure pick-up 33, with the result that the control system is aware of whether the milking cup 28 has been connected to the teat 29 in the correct manner. Thus it is also possible, if appropriate, to signal that the milking cup 28 has fallen or been kicked off the teat 29.

The pressure measurement in the entry chamber 30 can also be used to detect whether a quarter of the udder of the cow has been milked dry. As soon as a quarter has been milked dry, the teat 29 becomes slacker, since milk is no longer flowing into it. The result of this is that the air gap 36 becomes smaller, on the one hand due to the teat becoming slacker and on the other hand due to the milking cup 28 creeping upwards towards the udder. Owing to the smaller gap 36, less leakage air passes into the entry chamber 30 and the pressure in the entry chamber 30 falls. The pressure level, which during milking, for a specific diameter of the teat 29, is, for example, −10 to −15 kPa, then falls by 5 to 10 kPa, to reach −15 to −25 kPa. This fall in the pressure can be detected, with the result that the control system is aware that the udder quarter is empty and milking is terminated. The fall in the pressure is dependent on the teat and on the cow, and also on the lactation condition of the cow. This value may be taken as a fixed value per cow in the control system, but it is also possible to employ an average value or for this value to be calculated separately for each case.

FIG. 5 shows detail V from FIG. 1, with a sensor which can be used to establish whether the moveable fence 2 has been closed correctly. This closure is carried out using air cylinders in a manner which is otherwise known. A support plate 39, on which bellows 38 are situated, is attached to a fixed framework 37. The bellows 38 are connected, by means of an air supply connection 42 and a hose 41, to a pressure switch 40 which is positioned in a switch cabinet. When the moveable fence 2 is being closed, the bellows 38 are compressed, with the result that the pressure increases in the bellows 38, in the air supply connection 42 and in the air hose 41, and then in the pressure switch 40, with the result that the electrical terminal of the pressure switch 40 is connected through and the closure of the moveable fence 2 is detected in the control system. Naturally, sensors of this kind can also be used for other components of the milking device and also, for example, at the isolation gate 10 and the short-circuit gate 9.

FIG. 6 shows a sensor 44 with a detection field 43. Power to the sensor 44 is supplied by a power supply cable 45. Examples of a sensor 44 of this kind are a CCD camera, an ultrasonic sensor and the like. A control component is present in the sensor 44, which component converts the detection into information which is guided, via a fibre optic cable 48 and an opto-coupler 46 co the control system, via the signal cable 47. The opto-coupler 46 is positioned in a switch cabinet. Using the fibre optic cable 48 allows large amounts of information to be transmitted to the control system, where it can be processed, with the result that other parts of the milking device can be actuated. However, the information transmitted is no: subject to electromagnetic interference which may occur in the milking parlour.

In addition to the use of fibre optic cable or connecting sensors to the control system, the motors of the application equipment 13 can also be actuated via a fibre optic cable. As a result, only power supply cables which are more or less insensitive to electromagnetic interference are required to lead to these motors, while the signal transfer takes place via fibre optic cable, with the result that the effect of interference on the device is minimal.

What is claimed is:

1. A device for automatically milking animals, comprising one or more milking parlours with milking equipment having milking cups, stationary and movable fences for guiding and positioning animals, a control system for automatic and unmanned operation of the device, at least one sensor for detecting at least one of the position of the animals to be milked and the position or actions of various components of the milking device and a transducer for converting a signal produced by the sensor into an electrical signal which can be processed by the control system, wherein the device comprises a connecting line between the sensor and the connected transducer which is insensitive to electrical interference, and the sensor and the transducer are electrically insulated from one another.

2. The device according to claim 1, wherein the transducer is located in a switch cabinet.

3. The device according to claim 1, wherein the sensor for detecting the presence of an animal comprises a switching platform, a bellows on which at least part of the switching platform rests, a transducer which is able to convert changes in air pressure into an electrical signal and an air line for connecting the bellows and the transducer.

4. The device according to claim 3, wherein the transducer comprises a pressure switch which is adjusted in such a manner that it switches when the platform is loaded with a weight which essentially corresponds to the weight of an animal to be milked.

5. The device according to claim 3, wherein a passageway along the milking parlour comprises a plurality of switching platforms which are covered with a common cover.

6. The device according to claim 5, wherein the passageway is provided with a mechanically driven, moveable slide for cleaning the common cover.

7. The device according to claim 1, wherein:

the milking cups are provided with an entry chamber containing a sensor for detecting the presence of a teat in the milking cup;

the sensor comprises a transducer which is able to convert changes in air pressure into an electrical signal; and an air line for connecting the entry chamber to the transducer.

8. The device according to claim 7, wherein the transducer converts the pressure measured into an electrical signal which is proportional to the pressure.

9. The device according to claim 1, wherein:

a part of the milking device which can be moved by means of the control system is provided with a sensor for detecting a position thereof;

the sensor comprises bellows and a transducer which is able to convert changes in air pressure into an electrical signal; and an air line connects the bellows and the transducer.

10. The device according to claim 1, wherein:

the sensor is able to generate an optical signal;

the transducer is able to convert the optical signal into an electrical signal; and a fibre optic cable connects the sensor and the transducer.

11. The device according to claim 1, wherein:

the milking equipment comprises an application system for automatically applying milking cups around the teats of an animal to be milked;

the control system controls the application system on the basis of the information obtained using sensors; and a fibre optic cable is provided for transferring data between the control system and the application system.

12. A method for automatically milking animals comprising the steps of:

measuring, by means of a sensor, whether an udder quarter has been milked empty using a milking cup provided with an entry chamber;

and terminating milking of the udder quarter, wherein:

the sensor is a pressure sensor which can be used to measure the profile of the pressure in the entry chamber; and the milking is terminated when the pressure in the entry chamber during milking falls by an adjustable value.

* * * * *